Nov. 14, 1967  SHINOBU FUJIWARA ET AL  3,352,697
CERAMIC DIELECTRICS
Filed May 12, 1964
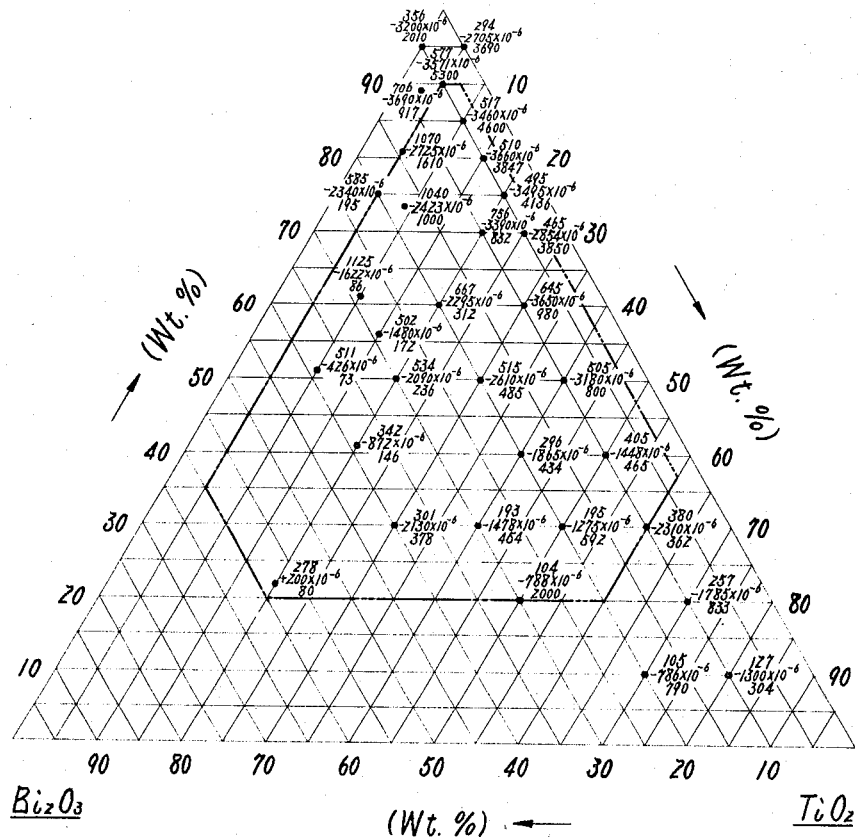
Shinobu Fujiwara,
Shigekazu Hayashi and
Kiyoto Kawakami
INVENTORS
BY Wenderoth, Lind
and Ponack
ATTORNEYS

United States Patent Office 3,352,697
Patented Nov. 14, 1967

3,352,697
CERAMIC DIELECTRICS
Shinobu Fujiwara, Minami-Akita-gun, Akita-ken, Shigekazu Hayashi, Tokyo, and Kiyoto Kawakami, Nikahomachi, Yuri-gen, Akita-ken, Japan, assignors to TDK Electronics Co., Ltd., Tokyo, Japan
Filed May 12, 1964, Ser. No. 366,765
3 Claims. (Cl. 106—39)

ABSTRACT OF THE DISCLOSURE

Ceramic dielectric materials are provided which consist of a sintered mixture of 20 to 90% by weight of pre-sintered $SrTiO_3$, 3 to 60% by weight of $Bi_2O_3$ and 5 to 60% by weight of $TiO_2$.

The present invention relates to ceramic dielectrics with high dielectric constants and small temperature coefficients of dielectric constants.

The object of the present invention is to provide ceramic dielectrics with high and fairly constant dielectric constants over a normal temperature region and high Q-values for the elements of various electronic circuits.

As well known, $BaTiO_3$ has been most widely used for practical purposes as a material having high dielectric constant. Nevertheless, due to the fact that the temperature coefficient of dielectric constant of barium titanate shows its maximum at about 120° C. and variation of its capacity depends highly on temperature, the applications were highly limited for practical purposes. Other dielectric materials with high dielectric constants so far used show as large temperature coefficients as barium titanate ($BaTiO_3$), and besides, they are unsatisfactory because of low Q-values.

The present invention provides dielectric materials with improved properties which have been found unsatisfactory in the materials so far used; ceramic dielectrics with high dielectric constant and small temperature coefficients are successfully produced from mixtures comprising mainly strontium titanate ($SrTiO_3$), dibismuth trioxide ($Bi_2O_3$) and titanic oxide ($TiO_2$).

The ceramic dielectrics of the present invention are prepared in the following manner: After pre-sintering, strontium titanate ($SrTiO_3$) is powdered and mixed with dibismuth trioxide ($Bi_2O_3$) and titanic oxide ($TiO_2$), then the mixture is shaped under pressure followed by sintering at a temperature higher than 1000° C. In the present invention, degeneration of the properties of the materials during storage between processes, e.g. by absorbing moisture, can be prevented by pre-sintering the strontium titanate ($SrTiO_3$), which helps to attain the object of the present invention effectively.

The ternary diagram in the accompanying drawing shows the relations between the three components of the products that is, strontium titanate, dibismuth trioxide and titanic oxide ($SrTiO_3$, $Bi_2O_3$, and $TiO_2$) and dielectric constants, its temperature coefficient and Q-value. The three numerical values at each point of composition represent dielectric constant, its temperature coefficient and Q-value respectively, going from above to below, and these properties were measured at the frequency of 1 mc./s.

In the present invention, to obtain the materials having desired properties, it is required, as can be seen from the diagram, the proportions of the three components of the products are limited as follows:

| Component: | Percentage by weight |
|---|---|
| $SrTiO_3$ | 20–90 |
| $Bi_2O_3$ | 3–60 |
| $TiO_2$ | 5–60 |

The reasons for limiting the proportions to the said values are: when the proportion of strontium titanate ($SrTiO_3$) is under 20 or over 90% by weight, dielectric constants become too low and their temperature coefficients do not indicate practically available values. When the proportion of dibismuth trioxide ($Bi_2O_3$) is under 3% by weight, dielectric constants and temperature coefficients deviate from the desired values, and when it exceeds 60%, Q-values become too low and the products are extremely highly porous bodies.

When the proportion of titanic oxide ($TiO_2$) is under 5% by weight, temperature coefficients of dielectric constants become too large and Q-values too small, and when it is over 60%, dielectric constants become too low and at the same time, the products become porous.

The following examples will give a closer insight into the present invention.

*Example 1*

Pre-sinter strontium titanate ($SrTiO_3$) at 1320° C., then grind it into powder, add dibismuth trioxide ($Bi_2O_3$) and titanic oxide ($TiO_2$) to it in the weight proportion of $$SrTiO_3:Bi_2O_3:TiO_2 = 73:18:9$$

and after shaping the mixture under pressure, sinter it at 1360° C. The ceramic dielectrics thus obtained show the following properties:

Dielectric constant _____ 1100
Temperature coefficient of dielectric
 constant _____ $-2400 \times 10^{-6}$/° C.
Q-value _____ 1000

*Example 2*

After pre-sintering at 1300° C., strontium titanate ($SrTiO_3$) is powdered and mixed with dibismuth trioxide ($Bi_2O_3$) and titanic oxide ($TiO_2$) in the weight proportion of $$SrTiO_3:Bi_2O_3:TiO_2 = 22:58:20$$

and after shaping under pressure, the mixture is sintered at 1260° C. The products thus obtained show the following properties:

Dielectric constant _____ 278
Temperature coefficient of dielectric
 constant _____ $+30 \times 10^{-6}$/° C.
Q-value _____ 80

*Example 3*

After pre-sintering at 1300° C., strontium titanate ($SrTiO_3$) is powdered and mixed with dibismuth trioxide ($Bi_2O_3$) and titanic oxide ($TiO_2$) in the weight proportion of $$SrTiO_3:Bi_2O_3:TiO_2 = 90:5:5$$

and after shaping under pressure, the mixture is sintered at 1380° C. The properties of the resultant products are:

Dielectric constant _____ 577
Temperature coefficient of dielectric
 constant _____ $-3570 \times 10^{-6}$/° C.
Q-value _____ 5000

*Example 4*

Strontium titanate ($SrTiO_3$) is pre-sintered at 1300° C., then powdered and mixed with dibismuth trioxide ($Bi_2O_3$) and titanic oxide ($TiO_2$) in the following proportion by weight:

$$SrTiO_3:Bi_2O_3:TiO_2 = 30:20:50$$

and after the mixture is shaped under pressure, it is sintered at 1280° C. The resultant products show the following properties:

Dielectric constant _____ 195
Temperature coefficient of dielectric
  constant _____ $-1275 \times 10^{-6}/°$ C.
Q-value _____ 600

*Example 5*

After pre-sintering at 1300° C., strontium titanate ($SrTiO_3$) is powdered and mixed with dibismuth trioxide ($Bi_2O_3$) and titanic oxide ($TiO_2$) in the weight proportion of $$SrTiO_3:BiO_2:TiO_2 = 41:39:20$$

and after shaping under pressure, the mixture is sintered at 1330° C. The products thus obtained show the following properties:

Dielectric constant _____ 342
Temperature coefficient of dielectric
  constant _____ $-872 \times 10^{-6}/°$ C.
Q-value _____ 146

We claim:
1. Ceramic dielectric consisting of a sintered mixture of $SrTiO_3$, $Bi_2O_3$ and $TiO_2$ in the weight proportion $SrTiO_3:Bi_2O_3:TiO_2 = 22:58:20$.
2. Ceramic dielectric consisting of a sintered mixture of $SrTiO_3$, $Bi_2O_3$ and $TiO_2$ in the weight proportion $SrTiO_3:Bi_2O_3:TiO_2 = 30:20:50$.
3. Ceramic dielectric consisting of a sintered mixture of $SrTiO_3$, $Bi_2O_3$ and $TiO_2$ in the weight proportion $SrTiO_3:Bi_2O_3:TiO_2 = 41:39:20$.

References Cited

UNITED STATES PATENTS

| 3,074,804 | 1/1963 | Planer | 106—39 |
| 3,179,525 | 4/1965 | Welsby et al. | 106—39 |

FOREIGN PATENTS

| 1,178,181 | 6/1957 | France. |

HELEN M. McCARTHY, *Primary Examiner.*